(12) United States Patent
Son

(10) Patent No.: US 12,485,952 B2
(45) Date of Patent: Dec. 2, 2025

(54) STEERING APPARATUS FOR VEHICLE

(71) Applicant: HYUNDAI MOBIS CO., LTD., Seoul (KR)

(72) Inventor: Chang Wook Son, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/799,500

(22) Filed: Aug. 9, 2024

(65) Prior Publication Data

US 2025/0153763 A1  May 15, 2025

(51) Int. Cl.
*B62D 3/06* (2006.01)
*B62D 1/16* (2006.01)
*B62D 5/00* (2006.01)
*B62D 5/04* (2006.01)
*F16H 25/16* (2006.01)

(52) U.S. Cl.
CPC ............... *B62D 3/06* (2013.01); *B62D 5/001* (2013.01); *B62D 5/005* (2013.01); *B62D 5/0403* (2013.01); *B62D 5/0448* (2013.01); *F16H 25/16* (2013.01); *B62D 1/16* (2013.01)

(58) Field of Classification Search
CPC ...... B62D 5/001; B62D 5/0409; B62D 5/006; B62D 5/0445; B62D 3/06; B62D 3/08; B62D 6/008; F16H 25/16; F16H 25/2015; F16H 2025/204
See application file for complete search history.

(56) References Cited

U.S. PATENT DOCUMENTS

| | | | | | |
|---|---|---|---|---|---|
| 1,921,122 | A | * | 8/1933 | Head | B62D 3/08 74/499 |
| 3,202,008 | A | * | 8/1965 | Geyer | F16H 25/2015 74/89.37 |
| 3,218,937 | A | * | 11/1965 | Dettlof | B62D 5/24 92/33 |
| 3,398,484 | A | * | 8/1968 | Katsumura | E05F 15/622 49/281 |
| 3,399,581 | A | * | 9/1968 | Valenti | F16H 25/2214 74/424.86 |
| 5,341,701 | A | * | 8/1994 | Krom | B62D 3/08 74/499 |
| 5,456,330 | A | * | 10/1995 | Kojima | B62D 7/148 74/424.89 |

(Continued)

FOREIGN PATENT DOCUMENTS

KR  10-2020-0047871 A  5/2020

*Primary Examiner* — Timothy Wilhelm
(74) *Attorney, Agent, or Firm* — Morgan, Lewis & Bockius LLP

(57) ABSTRACT

Provided is a steering apparatus for a vehicle including a housing, a rotational shaft rotatably mounted in the housing, a moving member interposed between the rotational shaft and the housing and moved by rotation of the rotational shaft, a first rotation limiter formed inside the housing and configured to limit an amount of a first direction movement of the moving member, thereby limiting an amount of a first direction rotation of the rotational shaft, and a second rotation limiter coupled to the housing and configured to cover an opening of the housing and to limit an amount of a second direction movement of the moving member, thereby limiting an amount of a second direction rotation of the rotational shaft.

13 Claims, 10 Drawing Sheets

(56) References Cited

U.S. PATENT DOCUMENTS

| | | | | |
|---|---|---|---|---|
| 5,472,065 A * | 12/1995 | Vergin | E05B 81/25 | |
| | | | 292/201 | |
| 5,803,202 A * | 9/1998 | Bohner | B62D 5/005 | |
| | | | 180/443 | |
| 6,374,693 B1 * | 4/2002 | Kawabe | B62D 3/06 | |
| | | | 180/443 | |
| 6,896,089 B2 * | 5/2005 | Mills | B62D 5/001 | |
| | | | 180/402 | |
| 7,562,594 B2 * | 7/2009 | Nagai | F16H 25/2015 | |
| | | | 188/134 | |
| 9,273,766 B2 * | 3/2016 | Shimizu | H02K 11/215 | |
| 9,744,988 B2 * | 8/2017 | Nitano | B62D 3/08 | |
| 9,802,641 B2 * | 10/2017 | Tomikawa | B62D 5/0448 | |
| 10,895,278 B2 * | 1/2021 | Kim | F16B 39/124 | |
| 11,098,790 B2 * | 8/2021 | Castell | F16H 25/2228 | |
| 11,204,082 B2 * | 12/2021 | Bonkowski | B62D 5/001 | |
| 11,554,807 B2 * | 1/2023 | Kondo | B62D 3/08 | |
| 11,745,788 B2 * | 9/2023 | Shin | B62D 5/001 | |
| | | | 180/402 | |
| 12,024,238 B2 * | 7/2024 | Jordan | B62D 5/001 | |
| 12,037,056 B2 * | 7/2024 | Kim | B62D 5/0445 | |
| 12,146,552 B2 * | 11/2024 | Watanabe | F16H 25/2204 | |
| 12,203,532 B2 * | 1/2025 | Gitnes | F16H 25/2015 | |
| 12,233,962 B2 * | 2/2025 | Cimatti | B62D 5/006 | |
| 2010/0319472 A1 * | 12/2010 | Wei | F16H 25/2021 | |
| | | | 74/89.37 | |
| 2015/0329138 A1 * | 11/2015 | Peterreins | B62D 3/08 | |
| | | | 74/424.75 | |
| 2018/0238377 A1 * | 8/2018 | Kim | B62D 6/10 | |
| 2020/0070871 A1 * | 3/2020 | Du | B62D 15/0215 | |
| 2021/0394818 A1 * | 12/2021 | Zinnecker | B62D 3/08 | |
| 2023/0026718 A1 * | 1/2023 | Major | B66F 9/24 | |

* cited by examiner

STEERING APPARATUS FOR VEHICLE

CROSS-REFERENCE TO RELATED APPLICATION

The present application claims priority to and the benefit of Korean Patent Application No. 10-2023-0157199, filed on Nov. 14, 2023 in the Korean Intellectual Property Office, the entire disclosure of which is incorporated herein by reference.

BACKGROUND

Field

Exemplary embodiments of the present disclosure relate to a steering apparatus for a vehicle and, more particularly, to a steering apparatus for a vehicle capable of limiting rotation of a rotational shaft.

Description of the Related Art

A steer-by-wire (SBW) system is an electrically signaled intelligent steering system transmitting a driver's steering intentions through electrical signals without a mechanical connection between the driver's steering wheel and the vehicle wheels for control.

The SBW system incorporates a steering feedback actuator (SFA), which provides the driver with reaction force of the steering wheel, and a road wheel actuator (RWA), which transmits the driver's steering intention to the vehicle wheels and moves the wheels. The SFA and RWA are connected only by wires without mechanical connection. Accordingly, the SFA system requires a structure that limits a rotational direction. In the related art, the number of rotations is limited using a leadscrew mechanism.

The leadscrew mechanism in the related art faces challenges in managing straightness due to variations in tolerances resulting from injection molding processes for plastic bushings. Friction dispersion due to clearance between the plastic bushing and nuts significantly increases, and noise is generated when using steel nuts. Assembly of square-shaped bushings requires increased housing machining costs and additional processes.

During friction evaluation at extremely low temperatures, plastic may experience adhesion due to shrinkage, leading to increased friction. In addition, the plastic needs to be set to high strength to accommodate an increase in stopping torque during steering. Therefore, there is a need for improvement in this issue.

The related art of the present disclosure is disclosed in Korean Patent Application Publication No. 10-2020-0047871 (published on May 8, 2020, and entitled "APPARATUS FOR LIMITED STEERING ANGLE IN STEER-BY-WIRE SYSTEM").

SUMMARY

The present disclosure has been made in an effort to solve the above-mentioned problem, and an object of the present disclosure is to provide a steering apparatus for a vehicle capable of limiting rotation of a rotational shaft.

According to the present disclosure, the steering apparatus for a vehicle includes: a housing, a rotational shaft rotatably mounted in the housing, a moving member interposed between the rotational shaft and the housing and moved by a rotation of the rotational shaft, a first rotation limiter formed inside the housing and configured to limit an amount of a first direction movement of the moving member, thereby limiting an amount of a first direction rotation of the rotational shaft, and a second rotation limiter coupled to the housing and configured to cover an opening of the housing and to limit an amount of a second direction movement of the moving member, thereby limiting an amount of a second direction rotation of the rotational shaft.

The rotational shaft may be provided with a spiral onto which the moving member is engaged and configured to move the moving member in response to the rotation of the rotational shaft.

The first rotation limiter may include a guide recessed in an inner surface of the housing, formed along the axial direction of the rotational shaft, and configured to guide a movement of the moving member, and a locking protrusion provided on one side of the guide and configured to limit the first direction movement of the moving member.

The moving member may include a spherical ball member.

The ball member may roll between the spiral and the guide.

The ball member, the spiral, and the guide may have the same curvature.

The guide may be formed in a shape of a straight line or in a shape of a diagonal line.

A plurality of the moving members may be provided. A plurality of spirals may be provided in the rotational shaft, the plurality of spirals being configured to move the plurality of the moving members, respectively.

The plurality of the moving members may be positioned at corresponding positions on the plurality of the spirals along the axial direction of the rotational shaft.

The spiral may include a first spiral formed along the axial direction of the rotational shaft, and a second spiral formed along the axial direction of the rotational shaft and spaced apart from the first spiral.

A plurality of the first rotation limiters is spaced apart in an inner side of the housing.

The plurality of the moving members simultaneously contacts with the plurality of the first rotation limiters, respectively, when coming into contact with the first rotation limiters.

The plurality of the moving members simultaneously contacts with the second rotation limiter, respectively, when coming into contact with the second rotation limiter.

According to the present disclosure, when a driver operates a steering wheel, the rotational shaft, connected to the steering wheel, rotates. The moving member, which moves along the axial direction of the rotational shaft, is limited in movement by the first rotation limiter or the second rotation limiter, thereby causing the rotational shaft to rotate within a set angle.

In addition, the present disclosure may distribute the load on the first rotation limiter and the second rotation limiter due to the plurality of moving members, which moves along the axial direction of the rotational shaft.

DETAILED DESCRIPTION

Figure 1:
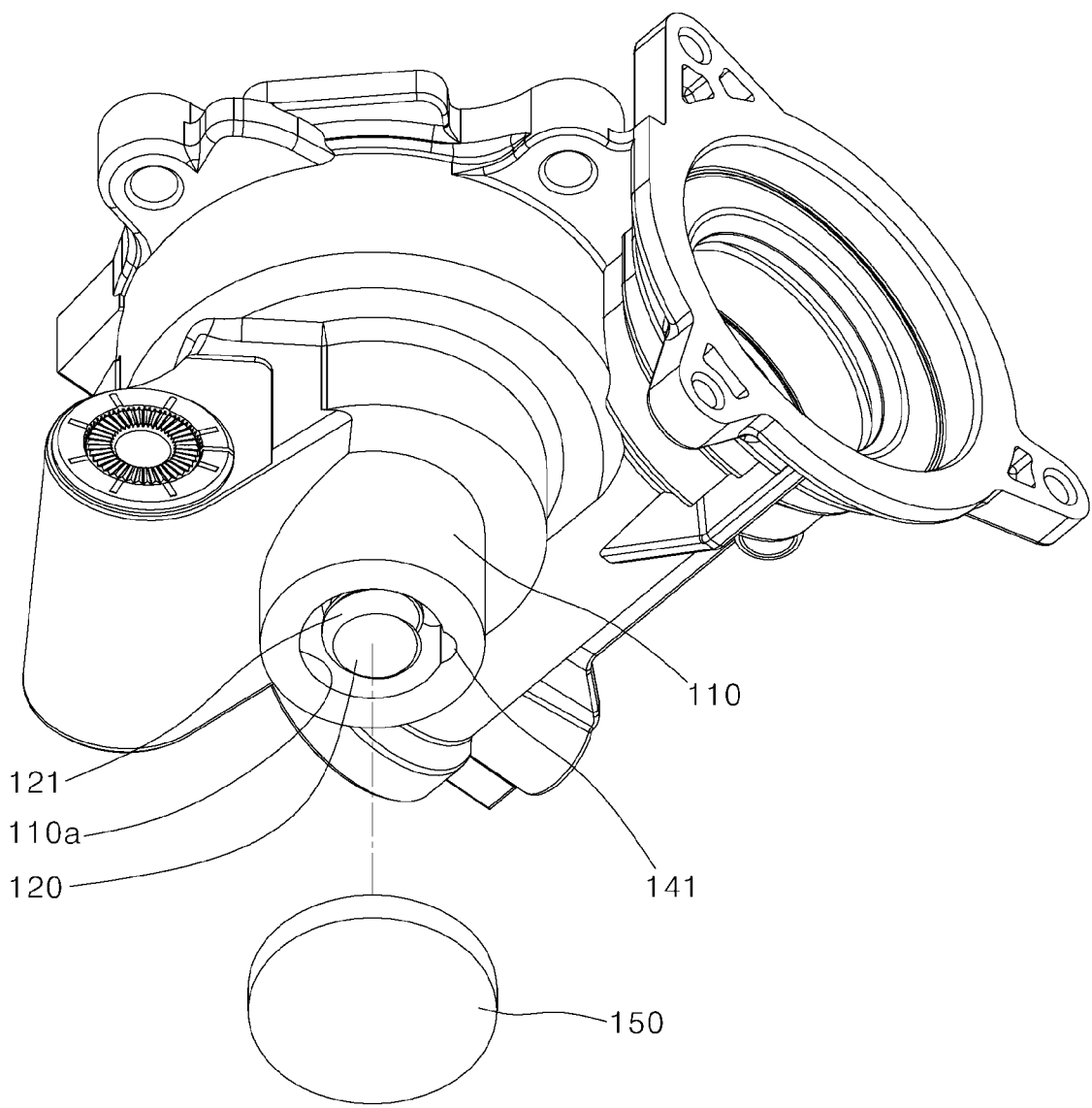
FIG. 1 is a bottom perspective view illustrating a steering apparatus for a vehicle according to a first embodiment of the present disclosure.

Hereinafter, embodiments of a steering apparatus for a vehicle according to the present disclosure will be described in detail with reference to the accompanying drawings. For clarity and convenience in description, thicknesses of lines, sizes of constituent elements, and the like may be illustrated in a non-exact proportion in the drawings. In addition, the terms used below are defined in consideration of the functions thereof in the present disclosure and may vary depending on the intention of a user or an operator or common practice. Therefore, these terms should be contextually defined in light of the present specification.

Figure 2:
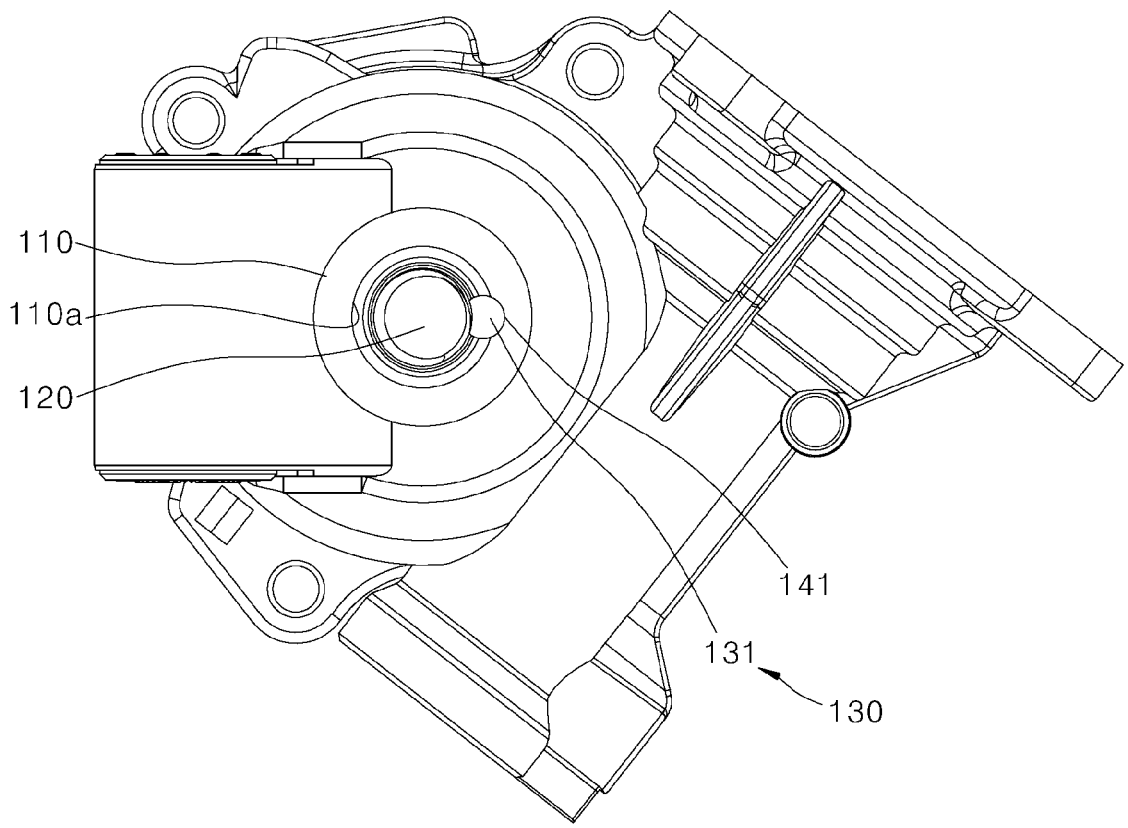
FIG. 2 is a bottom view illustrating the steering apparatus for a vehicle according to the first embodiment of the present disclosure.
Figure 3:
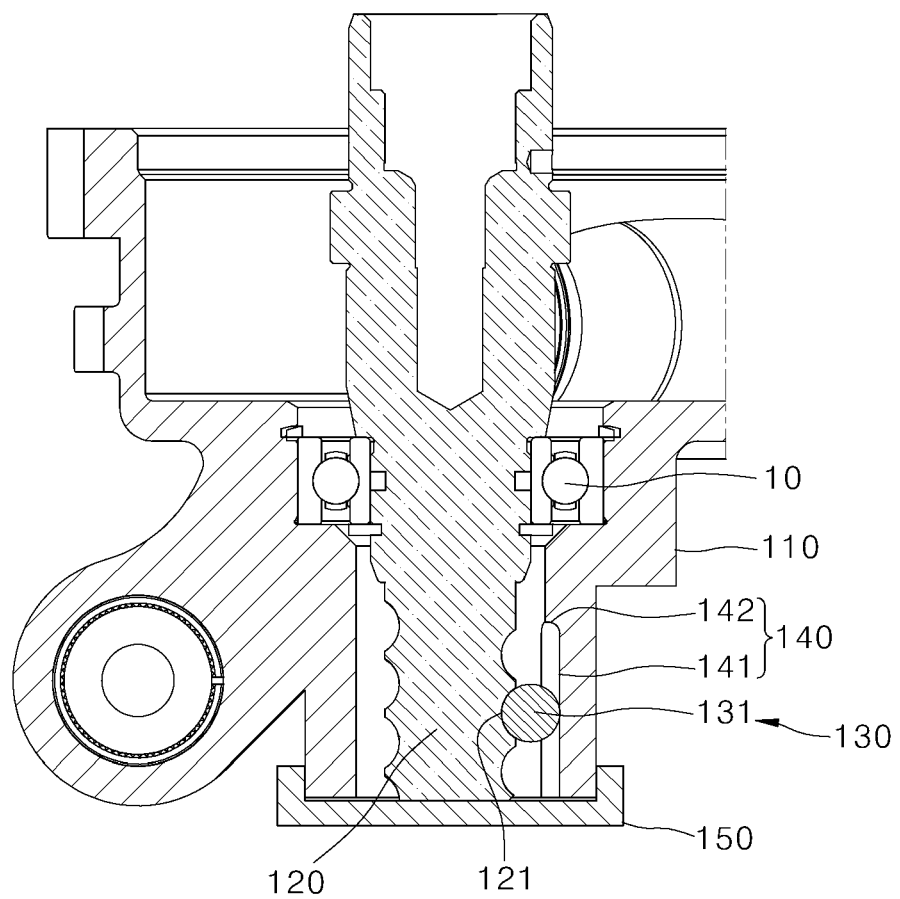
FIG. 3 is a sectional view illustrating the steering apparatus for a vehicle according to the first embodiment of the present disclosure.

FIG. 1 is a bottom perspective view illustrating a steering apparatus for a vehicle according to a first embodiment of the present disclosure. FIG. 2 is a bottom view illustrating the steering apparatus for a vehicle according to the first embodiment of the present disclosure. FIG. 3 is a sectional view illustrating the steering apparatus for a vehicle according to the first embodiment of the present disclosure.

Referring to FIGS. 1 to 5, a steering apparatus 1 for a vehicle according to the first embodiment of the present disclosure includes a housing 110, a rotational shaft 120, a moving member 130, a first rotation limiter 140, and a second rotation limiter 150.

The housing 110 may be mounted on a vehicle body. The housing 110 may be made of metal or resin and may be fixedly installed on the vehicle body forming a driver seat. An opening 110a may be provided on one side (lower side in FIG. 1) of the housing 110. The rotational shaft 120 is rotatably accommodated in the housing 110. One side (upper side in FIG. 3) of the rotational shaft 120 may be engaged to a shaft of a worm wheel (not illustrated) mounted in the steering apparatus 1 for a vehicle and may be axially rotated in response to rotation of the shaft of the worm wheel.

The rotational shaft 120 may be axially coupled to a bearing installed inside the housing 110. The bearing 10 may rotatably support the rotational shaft 120.

The moving member 130 is interposed between the rotational shaft 120 and the housing 110. The moving member 130 is moved by rotation of the rotational shaft 120. The moving member 130 may include a spherical ball member 131. The ball member 131 may be made of metal or plastic.

The rotational shaft 120 may be provided with a spiral 121. The spiral 121 may be formed on the outer circumferential surface of the opposite side (lower side in FIG. 3) of the rotational shaft 120. The spiral 121 may be formed along the axial direction of the rotational shaft 120. The spiral 121 may be configured to move the moving member 130. Here, the rotational shaft 120 may be exemplified as a single-threaded screw.

The ball member 131 may be seated on a screw groove of the spiral 121. In this case, the ball member 131 may have the same curvature as the screw groove.

The first rotation limiter 140 may be provided inside the housing 110. The first rotation limiter 140 limits the amount of a first direction movement (a) of the moving member 130 so that the amount of a first direction rotation (A) of the rotational shaft 120 is limited.

That is, the first rotation limiter 140 may limit the rotation of the rotational shaft 120 by limiting the movement of the moving member 130 so that the rotational shaft 120 rotates within a set angle. The first rotation limiter 140 may include a guide 141 and a locking protrusion 142.

The guide 141 may be recessed in an inner side of the housing 110. The guide 141 may be formed along the axial direction of the rotational shaft 120. The guide 141 may guide a movement of the moving member 130.

The ball member 131 may be seated on the guide 141. The ball member 131 may have the same curvature as the guide 141. The ball member 131 may roll between the spiral 121 and the guide 141. In addition, depending on the rotation direction of the rotational shaft 120, the ball member 131 may reciprocally move in the axial direction of the rotational shaft 120.

Grease may be applied to the ball member 131 rolling between the spiral 121 and the guide 141 to reduce friction resistance.

The guide 141 may be formed in a shape of a straight line identical to the axial direction of the rotational shaft 120 or in a shape of a diagonal line inclined at a set angle.

The locking protrusion 142 may be provided on one side (upper side in FIG. 3) of the guide 141. The locking protrusion 142 may protrude from the guide 141 toward the rotational shaft 120. Additionally, the guide 141 may be stepped relative to the locking protrusion 142. The locking protrusion 142 may limit a movement of the moving member 130.

The second rotation limiter 150 is coupled to the housing 110. The second rotation limiter 150 covers the opening 110a of the housing 110. The second rotation limiter 150 limits the amount of a second direction movement (b) of the moving member 130 so that the amount of a second direction rotation (B) of the rotational shaft 120 is limited.

That is, the second rotation limiter 150 may limit the rotation of the rotational shaft 120 by limiting the movement of the moving member 130 so that the rotational shaft 120 rotates within a set angle.

The operation process of the steering apparatus for a vehicle according to the first embodiment of the present disclosure with the above-described configuration is described as below.

Figure 4:
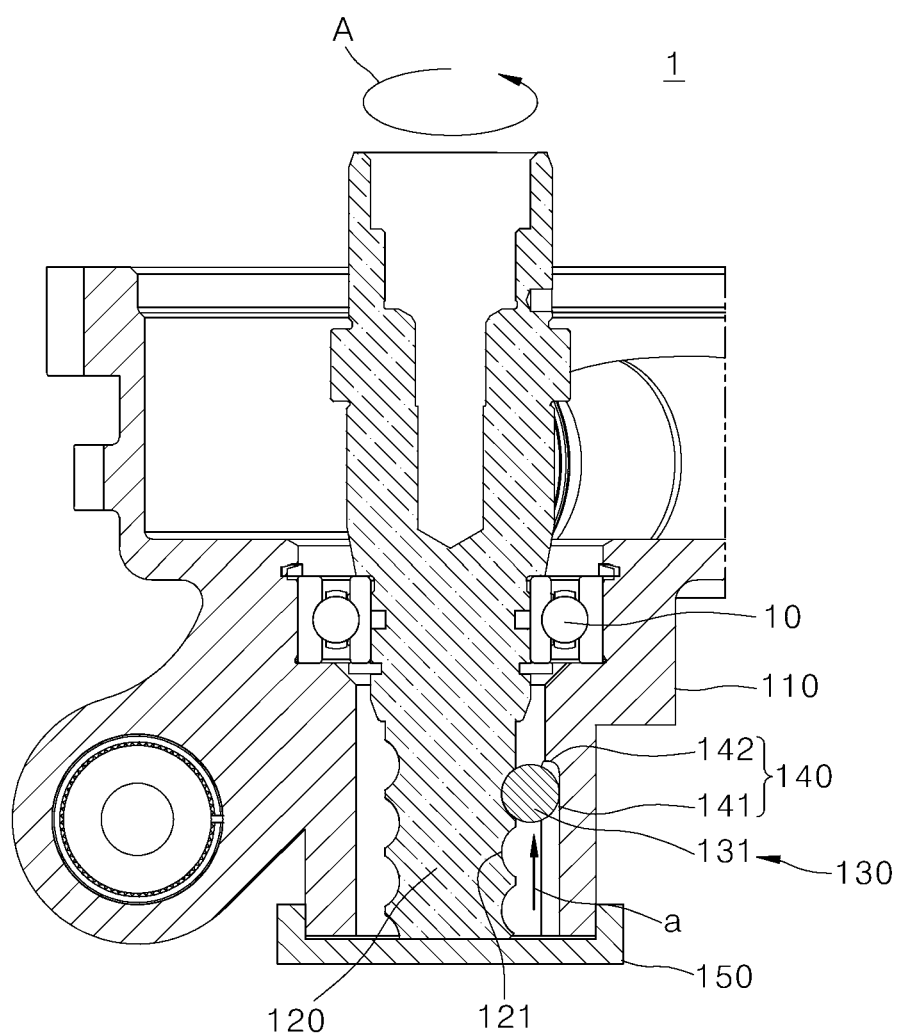
FIG. 4 and FIG. 5 are sectional views illustrating an operation state of the steering apparatus for a vehicle according to the first embodiment of the present disclosure.
Figure 5:
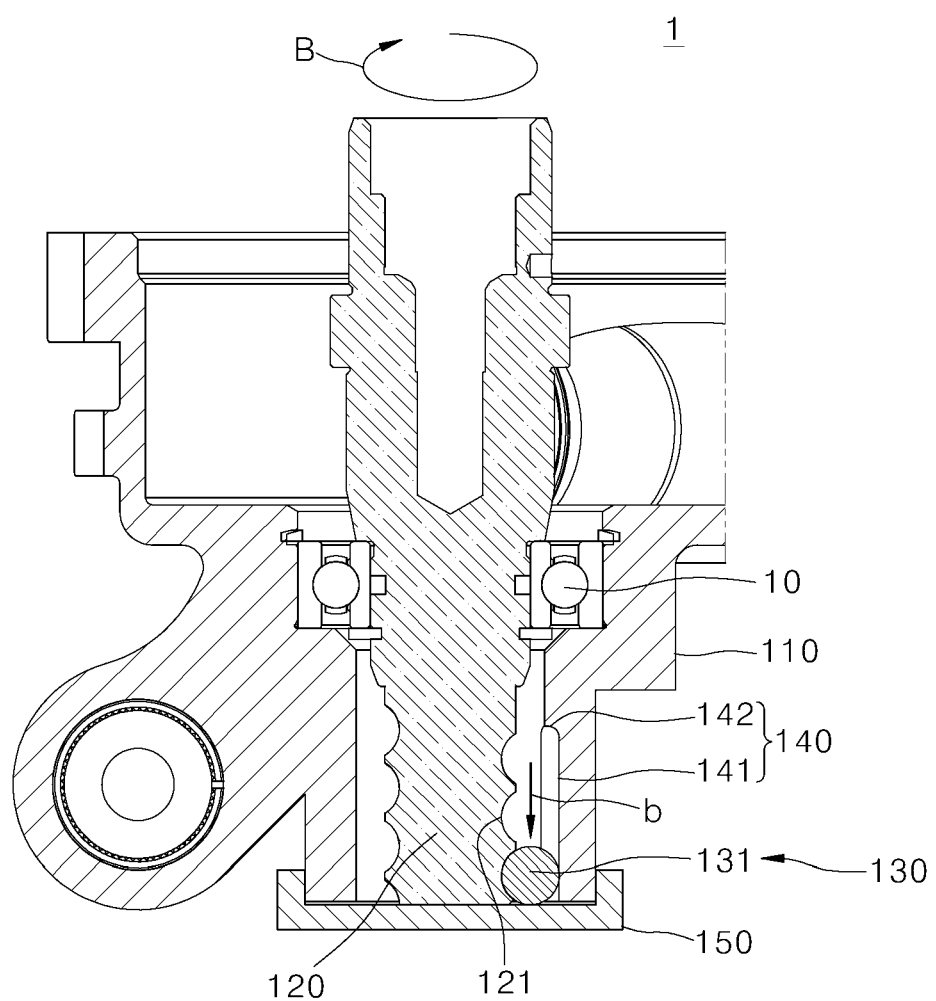

FIG. 4 and FIG. 5 are sectional views illustrating an operation state of the steering apparatus for a vehicle according to the first embodiment of the present disclosure.

Referring to FIGS. 1 and 4, when the rotational shaft 120 performs the first direction rotation (A), the moving member 130 performs the first direction movement (a) along the spiral 121 of the rotational shaft 120. In this case, the movement of the moving member 130 is guided toward the axial direction of the rotational shaft 120 by the guide 141. Here, the first direction rotation (A) of the rotational shaft 120 may be counterclockwise, and the first direction movement (a) of the moving member 130 may be in the direction opposite (upper side in FIG. 4) to the position of the opening 110a of the housing 110.

The moving member 130, which performs the first direction movement (a) by the spiral 121 of the rotational shaft 120 and the guide 141, is limited in movement by the locking protrusion 142, thereby limiting the first direction rotation (A) of the rotational shaft 120.

Referring to FIGS. 1 and 5, when the rotational shaft 120 performs the second direction rotation (B), the moving member 130 performs the second direction movement (b) along the spiral 121 of the rotational shaft 120. In this case, the movement of the moving member 130 is guided toward the axial direction of the rotational shaft 120 by the guide 141. Here, the second direction rotation (B) of the rotational shaft 120 may be clockwise, and the second direction movement (b) of the moving member 130 may be in the direction (lower side in FIG. 5) where the opening 110a of the housing 110 is positioned.

The moving member 130, which performs the second direction movement (b) by the spiral 121 of the rotational shaft 120 and the guide 141, is limited in movement by the second rotation limiter 150, which is coupled to the housing 110 and configured to cover the opening 110a, thereby limiting the second direction rotation (B) of the rotational shaft 120.

Figure 6:
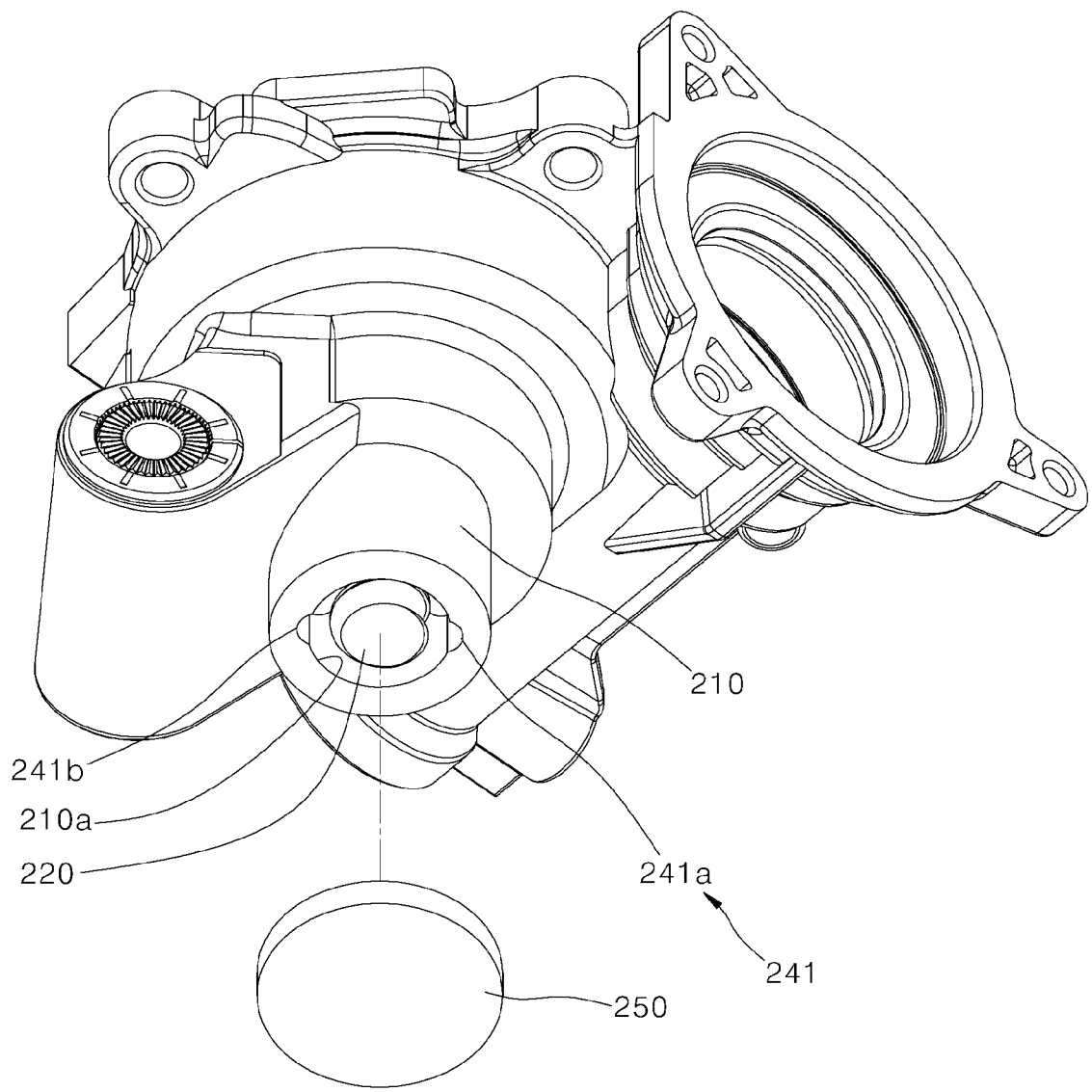
FIG. 6 is a bottom perspective view illustrating a steering apparatus for a vehicle according to a second embodiment of the present disclosure.
Figure 7:
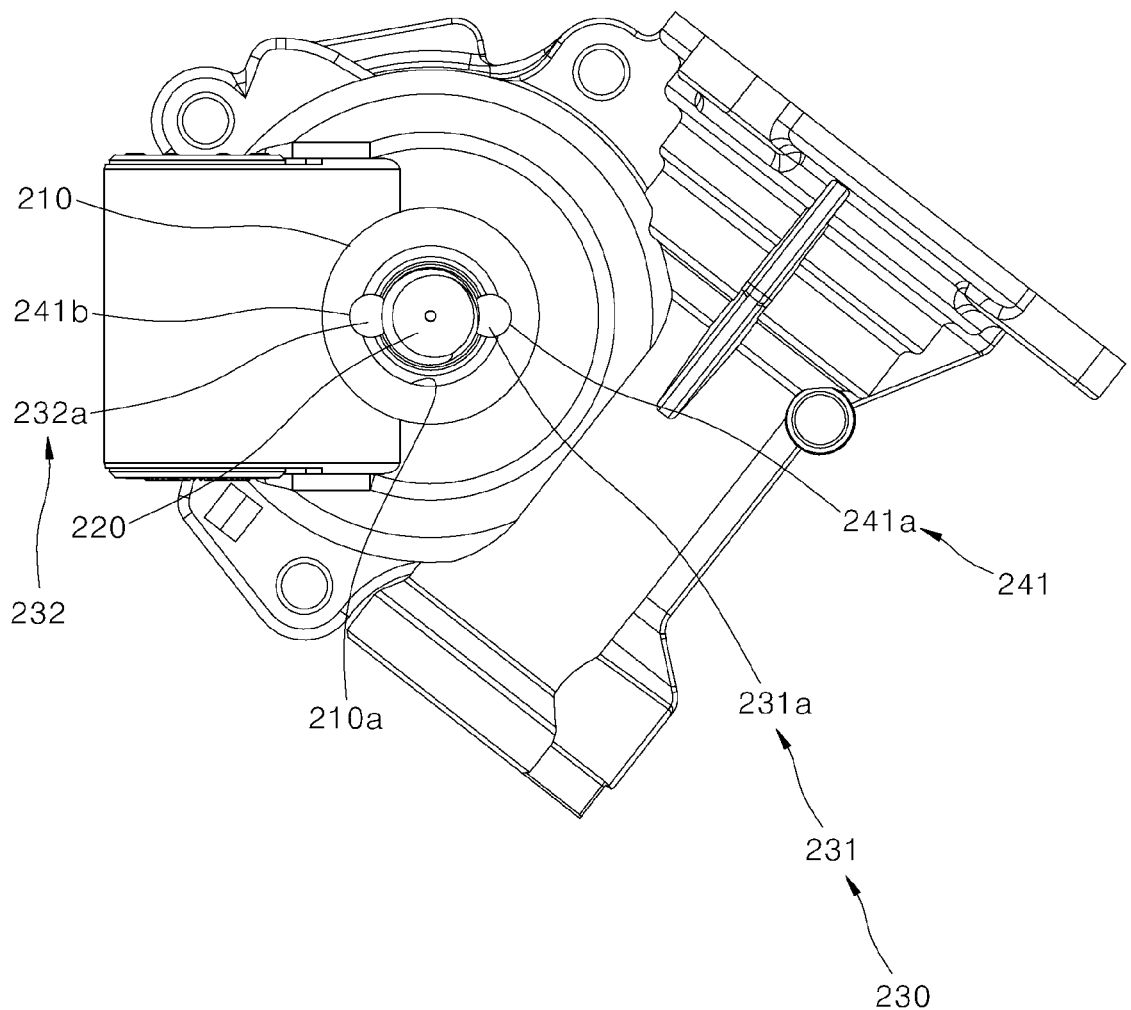
FIG. 7 is a bottom view illustrating the steering apparatus for a vehicle according to the second embodiment of the present disclosure.
Figure 8:
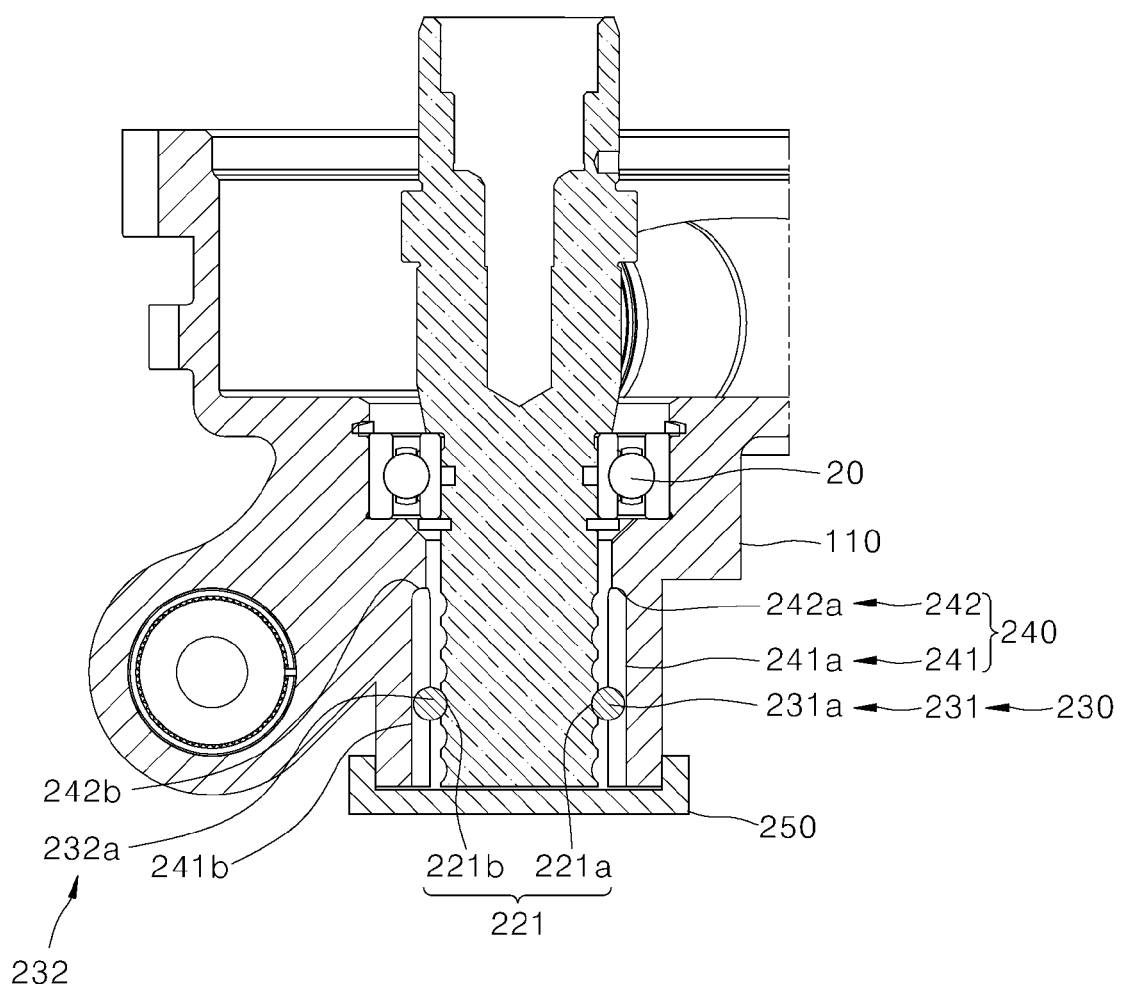
FIG. 8 is a sectional view illustrating the steering apparatus for a vehicle according to the second embodiment of the present disclosure.

FIG. 6 is a bottom perspective view illustrating a steering apparatus for a vehicle according to a second embodiment of the present disclosure. FIG. 7 is a bottom view illustrating the steering apparatus for a vehicle according to the second embodiment of the present disclosure. FIG. 8 is a sectional view illustrating the steering apparatus for a vehicle according to the second embodiment of the present disclosure.

Referring to FIGS. 6 to 10, a steering apparatus 2 for a vehicle according to the second embodiment includes a housing 210, a rotational shaft 220, a moving member 230, a first rotation limiter 240, and a second rotation limiter 250, and details are as below.

The housing 210 may be mounted on a vehicle body. The housing 210 may be made of metal or resin and may be fixedly installed on the vehicle body forming a driver seat. An opening 210a may be provided on one side (lower side in FIG. 6) of the housing 210.

The rotational shaft 220 is rotatably accommodated in the housing 210. One side (upper side in FIG. 8) of the rotational shaft 220 may be engaged to a shaft of a worm wheel (not illustrated) mounted in the steering apparatus 2 for a vehicle and may be axially rotated in response to rotation of the shaft of the worm wheel.

The rotational shaft 220 may be axially coupled to a bearing 20 installed inside the housing 210. The bearing 20 may rotatably support the rotational shaft 220.

The moving member 230 is interposed between the rotational shaft 220 and the housing 210. The moving member 230 is moved by rotation of the rotational shaft 220. The moving member 230 may include a spherical ball member 231. The ball member 231 may be made of metal or plastic.

A plurality of moving members 230 may be provided. According to an embodiment, the moving member 230 may include a first moving member 231 and a second moving member 232. Additionally, the first moving member 231 may include a first ball member 231a, and the second moving member 232 may include a second ball member 232a.

The rotational shaft 220 may be provided with a spiral 221. The spiral 221 may be formed on the outer circumferential surface of the opposite side (lower side in FIG. 8) of the rotational shaft 220. A plurality of spirals 221 may be provided. In other words, the rotational shaft 220 may include a multi-threaded screw having the plurality of spirals 221.

According to an embodiment, the spiral 221 may include a first spiral 221a and a second spiral 221b. The first spiral 221a may be formed along the axial direction of the rotational shaft 220. The first spiral 221a may be configured to move the first moving member 231.

The second spiral 221b may be formed along the axial direction of the rotational shaft 220. The second spiral 221b may be spaced apart from the first spiral 221a. In the second embodiment, the rotational shaft 220 may be exemplified as a double-threaded screw.

The first ball member 231a may be seated on a screw groove of the first spiral 221a. The first ball member 231a may have the same curvature as the screw groove of the first spiral 221a.

The second ball member 232a may be seated on a screw groove of the second spiral 221b. The second ball member 232a may have the same curvature as the screw groove of the second spiral 221b.

The first rotation limiter 240 may be provided inside the housing 210. The first rotation limiter 240 limits the amount of a first direction movement (a) of the moving member 230 so that the amount of a first direction rotation (A) of the rotational shaft 220 is limited.

That is, the first rotation limiter 240 may limit the rotation of the rotational shaft 220 by limiting the movement of the moving member 230 so that the rotational shaft 220 rotates within a set angle. A plurality of the first rotation limiters 240 may be provided.

The plurality of the first rotation limiters 240 may be spaced apart on an inner side of the housing 210. Additionally, the plurality of the first rotation limiters 240 may be spaced apart along the circumferential direction of the housing 210. The first rotation limiter 240 may include a guide 241 and a locking protrusion 242.

The guide 241 may be recessed in an inner side of the housing 210. The guide 241 may be formed along the axial direction of the rotational shaft 220. The guide 241 may guide a movement of the moving member 230. The guide 241 may include a first guide 241a and a second guide 241b.

The first ball member 231a may be seated on the first guide 241a. The first ball member 231a may have the same curvature as the first guide 241a. The first ball member 231a may roll between the first spiral 221a and the guide 241a. Grease may be applied to the first ball member 231a rolling between the first spiral 221a and the first guide 241a to reduce friction resistance.

The second ball member 232a may be seated on the second guide 241b. The second ball member 232a may have the same curvature as the second guide 241b. The second ball member 232a may roll between the second spiral 221b and the second guide 241b. Grease may be applied to the second ball member 232a rolling between the second spiral 221b and the second guide 241b to reduce friction resistance.

Depending on the rotation direction of the rotational shaft 220, the first ball member 231a and the second ball member 232a may reciprocally move in the axial direction of the rotational shaft 220.

The first guide 241a and the second guide 241b may be formed in a shape of a straight line identical to the axial direction of the rotational shaft 220 or in a shape of a diagonal line inclined at a set angle.

The locking protrusion 242 may be provided on one side (upper side in FIG. 8) of the guide 241. The locking protrusion 242 may protrude from the guide 241 toward the rotational shaft 220.

Additionally, the guide 241 may be stepped relative to the locking protrusion 242.

A plurality of locking protrusions 242 may be provided. For example, in the case of a double-threaded screw, two locking protrusions 242 may be provided, and in the case of a triple-threaded screw, three locking protrusions 242 may be provided.

In other words, the number of moving members 230 may be equal to the number of locking protrusions 242. When the rotational shaft 220 is a double-threaded screw in which two spirals 221 are formed, the moving members 230 may be positioned on the threads, respectively, and each thread may be provided with the locking protrusion 242.

According to the second embodiment, the locking protrusion 242 may include a first locking protrusion 242a and a second locking protrusion 242b. The first locking protrusion 242a may limit a movement of the first moving member 231, and the second locking protrusion 242b may limit a movement of the second moving member 232.

The second rotation limiter 250 is coupled to the housing 210. The second rotation limiter 250 covers an opening 210a of the housing 210. The second rotation limiter 250 limits the amount of a second direction movement (b) of the moving member 230 so that the amount of a second direction rotation (B) of the rotational shaft 220 is limited.

That is, the second rotation limiter 250 may limit the rotation of the rotational shaft 220 by limiting the movement of the moving member 230 so that the rotational shaft 220 rotates within a set angle.

The operation process of the steering apparatus for a vehicle according to the second embodiment of the present disclosure with the above-described configuration is described as below.

Figure 9:
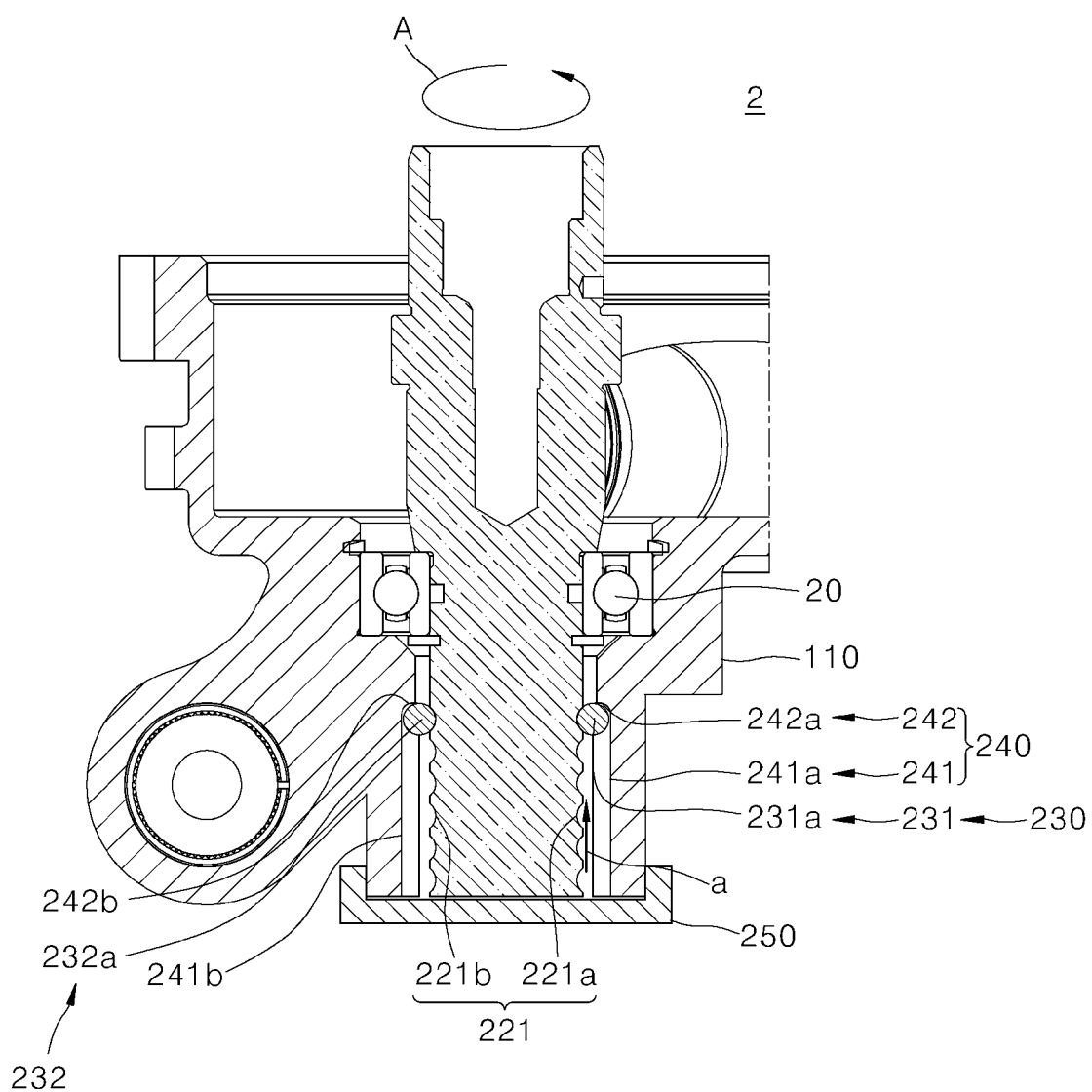
FIGS. 9 and 10 are sectional views illustrating an operation state of the steering apparatus for a vehicle according to the second embodiment of the present disclosure.
Figure 10:
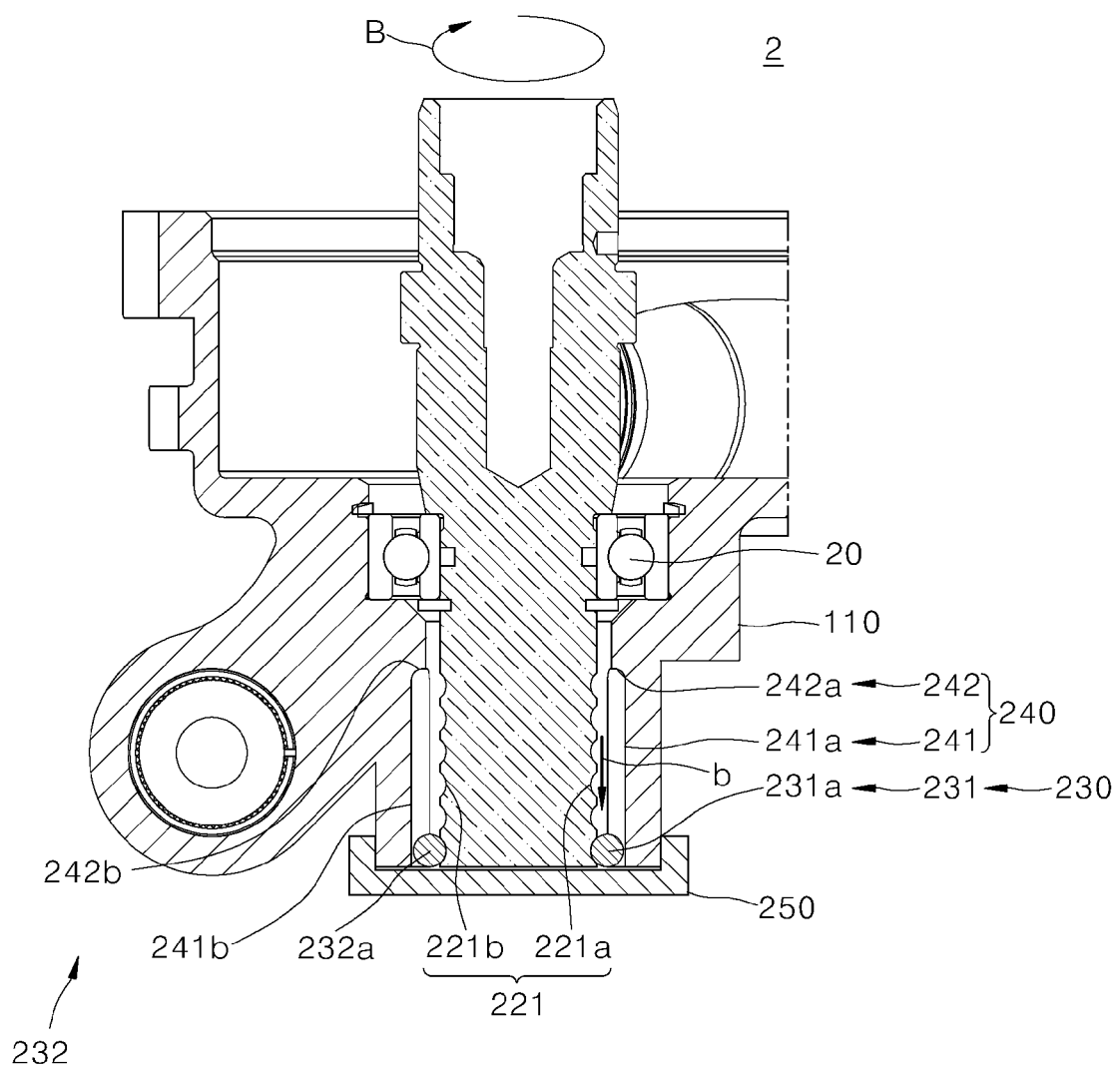

FIGS. 9 and 10 are sectional views illustrating an operation state of the steering apparatus for a vehicle according to the second embodiment of the present disclosure.

Referring to FIGS. 6 and 9, when the rotational shaft 220 performs the first direction rotation (A), the first moving member 231 and the second moving member 232 perform the first direction movement (a) along the first spiral 221a and the second spiral 221b of the rotational shaft 220.

The movement of the first moving member 231 is guided toward the axial direction of the rotational shaft 220 by the first guide 241a, and the movement of the second moving member 232 is guided toward the axial direction of the rotational shaft 220 by the second guide 241b.

The first direction rotation (A) of the rotational shaft 220 may be counterclockwise, and the first direction movement (a) of the first moving member 231 and the second moving member 232 may be in the direction opposite (upper side in FIG. 9) to the position of the opening 210a of the housing 210.

The first moving member 231, which performs the first direction movement (a) by the first spiral 221a of the rotational shaft 220 and the first guide 241a, and the second moving member 232, which performs the first direction movement (a) by the second spiral 221b and the second guide 241b, are limited in movement by the first locking protrusion 242a and the second locking protrusion 242b, respectively, thereby limiting the first direction rotation (A) of the rotational shaft 220.

The plurality of moving members 230 may be positioned at corresponding positions on the plurality of spirals 221 along the axial direction of the rotational shaft 220.

When the rotational shaft 220 is a double-threaded screw in which two spirals 221 are formed, the first moving member 231 and the second moving member 232 may be positioned at the same position in the axial direction and may be moved by the same amount. Therefore, the first moving member 231 and the second moving member 232 are each locked by the first locking protrusion 242a and the second locking protrusion 242b simultaneously.

The plurality of moving members 230 may come into contact with the first rotation limiter 240, respectively, particularly with the locking protrusion 242, thereby simultaneously contacting the plurality of locking protrusions 242, respectively.

When the rotational shaft 220 is a triple-threaded screw in which three spirals 221 are formed, three moving members may be positioned at the same position in the axial direction and may be moved by the same amount. Therefore, three moving members 230 are locked by three locking protrusions 242, respectively.

Referring to FIGS. 6 and 10, when the rotational shaft 220 performs the second direction rotation (B), the first moving member 231 and the second moving member 232 perform the second direction movement (b) along the first spiral 221a and the second spiral 221b of the rotational shaft 220.

The movement of the first moving member 231 is guided toward the axial direction of the rotational shaft 220 by the first guide 241a, and the movement of the second moving member 232 is guided toward the axial direction of the rotational shaft 220 by the second guide 241b.

The second direction rotation (B) of the rotational shaft 220 may be clockwise, and the first direction movement (a) of the first moving member 231 and the second moving member 232 may be in the direction (lower side in FIG. 10) where the opening 210a of the housing 210 is positioned.

The first moving member 231 performs the second direction movement (b) by the first spiral 221a of the rotational shaft 220 and the first guide 241a, and the second moving member 232 performs the second direction movement (b) by the second spiral 221b and the second guide 241b. Both moving members are limited in movement by the second rotation limiter 250, which is coupled to the housing 210 and configured to cover the opening 210a, thereby limiting the second direction rotation (B) of the rotational shaft 220.

The steering apparatus 1 for a vehicle according to the first embodiment of the present disclosure may operate as follows: When a driver operates a steering wheel, the rotational shaft 120, connected to the steering wheel, rotates. The moving member 130, which moves along the axial direction of the rotational shaft 120, is limited in movement by the first rotation limiter 140 or the second rotation limiter 150, thereby causing the rotational shaft 120 to rotate within a set angle.

The steering apparatus 2 for a vehicle according to the second embodiment of the present disclosure may distribute the load on the first rotation limiter 240 and the second rotation limiter 250 due to the plurality of moving members 230, which moves along the axial direction of the rotational shaft 220.

The present disclosure has been described with reference to the embodiments illustrated in the drawings. Although exemplary embodiments of the disclosure have been disclosed for illustrative purposes, those skilled in the art will appreciate that various modifications and equivalent embodiments are possible. Thus, the true technical scope of the disclosure should be defined by the following claims.

What is claimed is:

1. A steering apparatus for a vehicle, the apparatus comprising:
   a housing;
   a rotational shaft rotatably mounted in the housing;
   a moving member interposed between the rotational shaft and the housing and moved by a rotation of the rotational shaft;
   a first rotation limiter formed on an inner surface of the housing and configured to limit an amount of a first direction movement of the moving member in a first direction along a longitudinal direction of the housing, thereby limiting an amount of a first direction rotation of the rotational shaft; and
   a second rotation limiter coupled to the housing and configured to cover an opening of the housing and to limit an amount of a second direction movement of the moving member in a second direction along the longitudinal direction of the housing, thereby limiting an amount of a second direction rotation of the rotational shaft,
   wherein the first direction is opposite to the second direction, and
   wherein the first rotation limiter includes:
      a guide recessed in the inner surface of the housing along an axial direction of the rotational shaft, wherein the moving member is engaged on the guide and the guide is configured to guide a movement of the moving member; and
      a locking protrusion disposed on one side of the guide and configured to limit the first direction movement of the moving member.

2. The apparatus of claim 1, wherein the rotational shaft is formed with a spiral onto which the moving member is engaged, and configured to move the moving member in response to the rotation of the rotational shaft.

3. The apparatus of claim 2, wherein the second rotation limiter covers an end of the guide to limit the second direction movement of the moving member in the guide.

4. The apparatus of claim 2, wherein the moving member includes a spherical ball member.

5. The apparatus of claim 4, wherein the ball member is mounted between the spiral and the guide and rolls between the spiral and the guide.

6. The apparatus of claim 4, wherein the ball member, the spiral, and the guide have a same curvature.

7. The apparatus of claim 2, wherein the guide is formed in a shape of a straight line or in a shape of a diagonal line.

8. The apparatus of claim 2,
   wherein the moving member is in plural and the spiral is in plural, and
   wherein the plurality of spirals is provided in the rotational shaft, the plurality of spirals being configured to move the plurality of the moving members, respectively.

9. The apparatus of claim 8, wherein the plurality of the moving members is positioned at corresponding positions on the plurality of the spirals along the axial direction of the rotational shaft.

10. The apparatus of claim 8, wherein the plurality of spirals includes:
    a first spiral formed along the axial direction of the rotational shaft; and
    a second spiral formed along the axial direction of the rotational shaft and spaced apart from the first spiral.

11. The apparatus of claim 8,
    wherein the first rotation limiter is in plural, and
    wherein the plurality of the first rotation limiters is spaced apart in an inner side of the housing.

12. The apparatus of claim 11, wherein the plurality of the moving members simultaneously contacts with the plurality of the first rotation limiters, respectively, when coming into contact with the first rotation limiters.

13. The apparatus of claim 11, wherein the plurality of the moving members simultaneously contacts with the second rotation limiter, when coming into contact with the second rotation limiter.

* * * * *

UNITED STATES PATENT AND TRADEMARK OFFICE
CERTIFICATE OF CORRECTION

| | | |
|---|---|---|
| PATENT NO. | : 12,485,952 B2 | Page 1 of 1 |
| APPLICATION NO. | : 18/799500 | |
| DATED | : December 2, 2025 | |
| INVENTOR(S) | : Chang Wook Son | |

It is certified that error appears in the above-identified patent and that said Letters Patent is hereby corrected as shown below:

On the Title Page

Please add:
--(30) Foreign Application Priority Data:
November 14, 2023 (KR) 10-2023-0157199--

Signed and Sealed this
Thirteenth Day of January, 2026

John A. Squires
*Director of the United States Patent and Trademark Office*